United States Patent [19]

Chegash et al.

[11] Patent Number: 5,272,934
[45] Date of Patent: Dec. 28, 1993

[54] SIDE ACCESS CONDUIT SUPPORT FITTING

[75] Inventors: Daniel F. Chegash, Roseville; Dixon L. Kelley, New Baltimore, both of Mich.

[73] Assignee: Teleflex Incorporated, Limerick, Pa.

[21] Appl. No.: 972,846

[22] Filed: Nov. 6, 1992

[51] Int. Cl.[5] .......................... F16C 1/10; F16L 3/08
[52] U.S. Cl. ................................. 74/502.4; 74/502.6; 248/74.1; 248/56; 24/339; 24/136 L
[58] Field of Search ................ 74/502.4, 502.6, 500.5; 24/336, 339, 301, 136 L; 248/74.1, 316.2, 56, 68.1

[56] References Cited

U.S. PATENT DOCUMENTS

| 2,542,442 | 2/1951 | Weber | 248/68.1 |
|---|---|---|---|
| 3,751,579 | 8/1973 | Nojiri | 248/56 |
| 4,339,213 | 7/1982 | Gilmore | 248/74.1 X |
| 4,400,992 | 8/1983 | Londres | 248/74.1 X |
| 4,509,710 | 4/1985 | Cooper et al. | 248/74.1 X |
| 4,541,602 | 9/1985 | Potzas | 24/339 X |
| 4,763,541 | 8/1988 | Spease | 74/501 |
| 4,936,161 | 6/1990 | Polando | 74/502 |
| 4,951,524 | 8/1990 | Niskanen | 74/502 |
| 5,033,701 | 7/1991 | Kraus | 248/74.1 X |
| 5,113,717 | 5/1992 | Plamper | 74/502.6 |
| 5,172,878 | 12/1992 | Lederman | 74/502.4 X |

FOREIGN PATENT DOCUMENTS

| 2-292591 | 12/1990 | Japan | 248/74.1 |
|---|---|---|---|
| 3-4086 | 1/1991 | Japan | 248/74.1 |
| 1075301 | 7/1967 | United Kingdom | 24/339 |
| 2080676 | 2/1982 | United Kingdom | 248/74.1 |

Primary Examiner—Vinh T. Luong
Attorney, Agent, or Firm—Reising, Ethington, Barnard, Perry & Milton

[57] ABSTRACT

A motion transmitting remote control cable assembly (10) comprises a motion transmitting core element (12) slideably supported in a first conduit (14). The assembly (10) also includes a support fitting (20) for supporting the first conduit (14) as it passes through a slot (22) in a support structure (24). The support fitting (20) includes first and second sides (26,28) with guides (30) along the sides for sliding into engagement with the slot in the support structure and retaining the support fitting in the slot. The support fitting (20) finally includes at least one receiving opening (32) extending transversely to the first side (26) for receiving at least one conduit (14) transversely of the sides (26,28).

17 Claims, 2 Drawing Sheets

SIDE ACCESS CONDUIT SUPPORT FITTING

TECHNICAL FIELD

The subject invention relates to motion transmitting remote control cable assemblies of the type for transmitting motion in a curved path by means of a flexible motion transmitting core element, and more particularly to assemblies for supporting motion transmitting cables as they pass through a support structure.

BACKGROUND OF THE INVENTION

Motion transmitting remote control cables require support brackets for support as they pass through a support structure such as a bulkhead. It is well known in the art to mold a bracket or support fitting around one or more conduits of a cable system. However, this molding process is time consuming, expensive, and not flexible enough to easily meet the needs of customers. Support fittings of the type described in U.S. Pat. No. 4,951,524, of common assignee herewith, allow the support fitting to be molded separate from the conduit, and thus many of the problems described above can be avoided. In this case, the conduit can snap into an opening in the fitting it whatever stage in the manufacturing process this is desired. Such an arrangement works well for supporting a single conduit as the conduit passes through a support structure, and where the single conduit is not likely to experience forces which will "pop" the conduit out of the constricted opening in which it is retained. Some other arrangement is needed to support multiple cables, or to support cables which may be subject to forces which can "pop" them out of the support fitting.

SUMMARY OF THE INVENTION AND ADVANTAGES

A motion transmitting remote control cable assembly for transmitting motion in a curved path comprises a first core element and a first motion transmitting core element slideably supported in the first conduit. The assembly also includes a support fitting for supporting the first conduit as the first conduit passes through a slot in a support structure. The support fitting includes first and second sides with guides along the sides for sliding into engagement with the slot in the support structure and retaining the support fitting in the slot. The assembly is characterized by the support fitting including receiving means extending transversely to the first side for receiving at least one conduit transversely of the sides.

In this manner, the conduit will be retained more securely as it passes through the slot in the support fitting because it cannot "pop" out of the support fitting once the support fitting is inserted into the slot. Also, this type of support fitting can support several conduits as they pass through the support structure.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
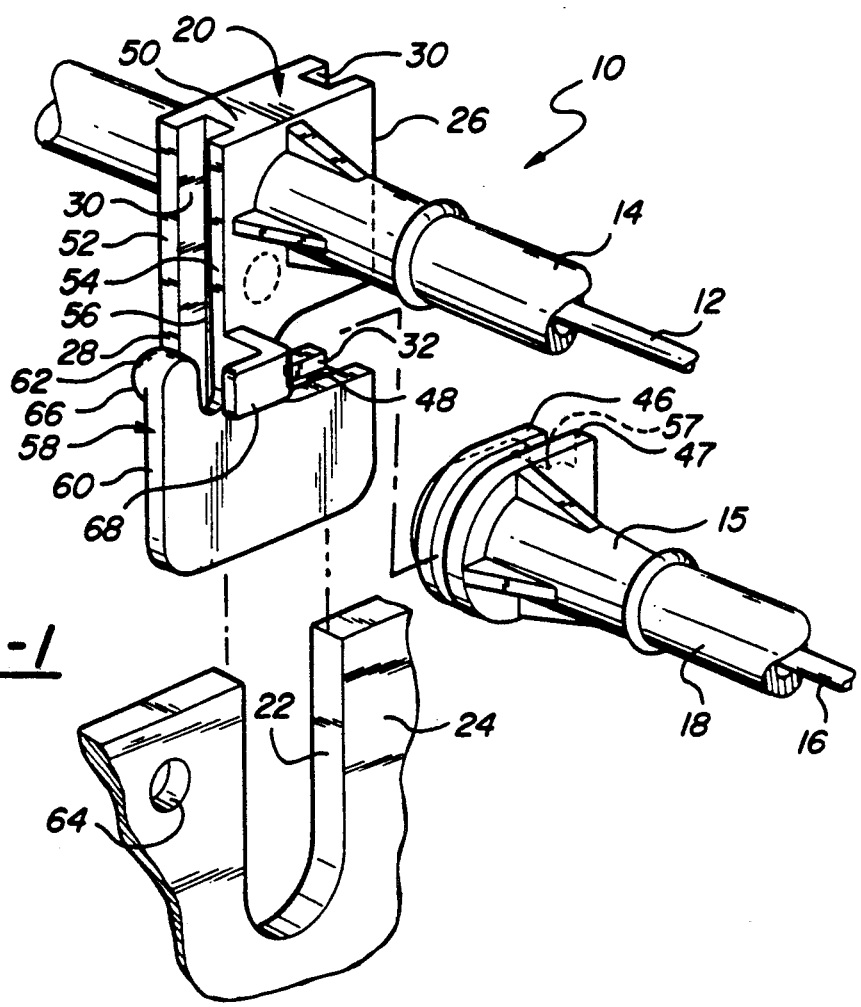
FIG. 1 is a perspective view of one embodiment of the subject invention exploded away from the support st the conduit.
Figures 2, 3:
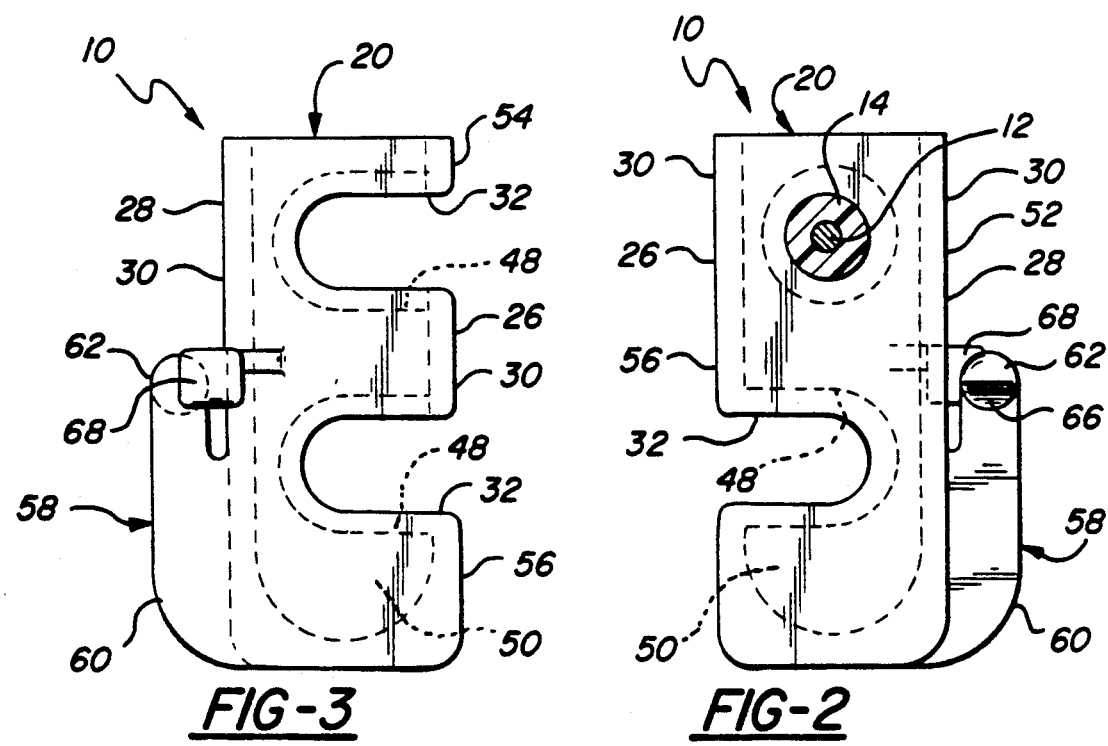
FIG. 2 is view of the embodiment of the invention FIG. 1.
FIG. 3 is a rear view of a second embodiment of the subject invention.

A motion transmitting remote control cable assembly generally shown at 10 for transmitting motion in a curved path comprises a first motion transmitting core element 12 slideably supported in a first conduit 14. The assembly 10 also includes a support fitting generally indicated at 20 for supporting the first conduit 14 as the first conduit passes through a slot 22 in a support structure 24. The support fitting 20 includes first and second sides 26,28 with guides 30 along the sides for sliding into engagement with the slot 22 in the support structure 24 and retaining the support fitting in the slot. The assembly 10 is characterized by the support fitting 20 including receiving means 32 extending transversely to the first side 26 for receiving at least one conduit 14 transversely of the sides 26,28. The idea behind having the receiving means 32 on one side of the support fitting 20 instead of at the top is that the receiving means will be completely closed once the support fitting 20 is slid into the slot 22 in the support structure 24. Thus, the conduit 14 cannot "pop" out of the support fitting 20 once the support fitting is in place in the support structure 24. Moreover, several conduits can be accommodated, not just one. And in fact, in the typical embodiment, the assembly 10 includes a second conduit 18 and a second motion transmitting core element 16 slideably supported in the second conduit 18, where the second conduit 18 passes through the slot 22 in the support structure 24 generally parallel to the first conduit 14.

Figure 4:
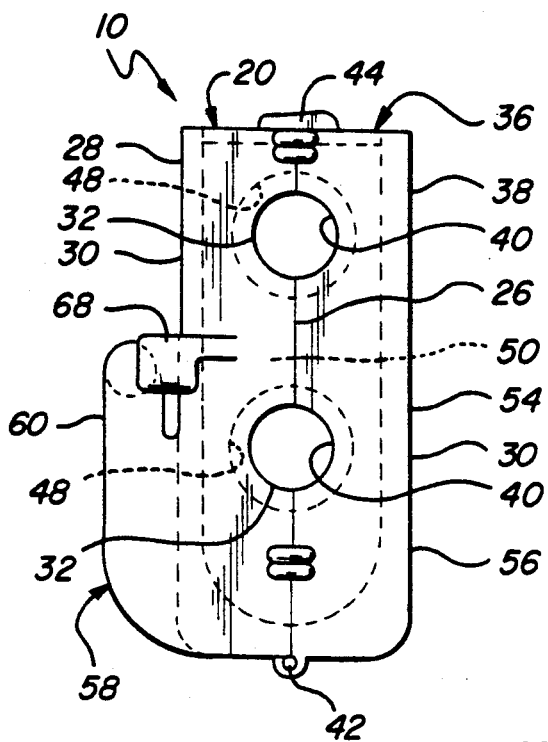
FIG. 4 is a rear view of a third embodiment of the subject invention.
Figure 5:
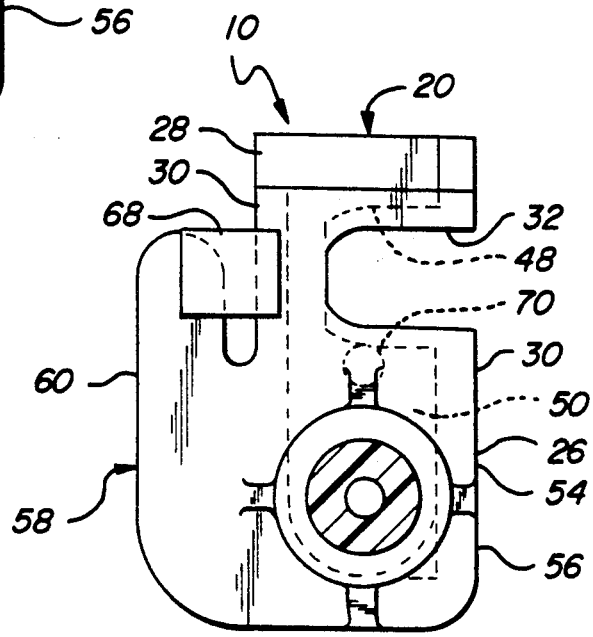
FIG. 5 is a rear view of a fourth embodiment of the subject assembly.
Figure 6:
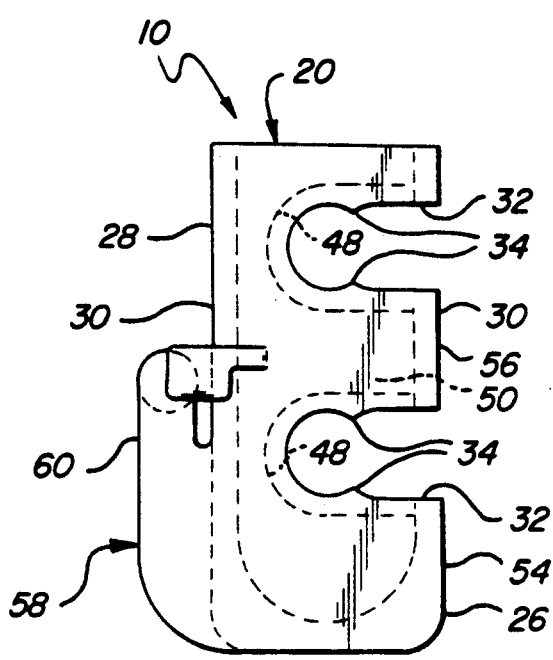
FIG. 6 is a rear view of a fifth embodiment of the subject assembly.

At least two main embodiments of this invention are possible: the first embodiment is a "side slide yoke" version (shown in FIGS. 1,2,3,5 and 6) where one or more conduits 14,18 each slide into a "U" shaped opening 32 in the side of the support fitting 20; the second embodiment is a hinged version (shown in FIG. 4) where one or more conduits 14,18 each slide into a "U" shaped opening 32 in the side of the support fitting 20, and then the side of the support fitting is closed with closing means generally indicated at 36 prior to inserting the support fitting into the slot 22 in the support fitting. Several different versions of the first embodiment (i.e. the "side slide yoke") are also possible.

In one such version (shown in FIGS. 1,2 and 5), the support fitting 20 is molded around one or more of the conduits 14,18, while there is one "U" shaped opening 32 in the first side 26 of the support fitting for receiving an additional conduit. This is the "mixed" embodiment. The two conduits 14,18 pass through the support fitting 20 in an over-and-under coaxial type of arrangement.

In another version (shown in FIG. 3), the receiving means 32 includes two "U" shaped openings in the first side 26 of the support fitting 20 each for slideably receiving a conduit 14,18. None of the conduits 14,18 are molded to the support fitting 20. Instead, both can slide into place in the support fitting 20. These openings 32 are also in over-and-under coaxial arrangement.

In another version (shown in FIG. 6), the "U" shaped opening or openings 32 in the first side 26 of the support fitting 20 have a constriction 34 constricting the "U" shaped opening or openings 32 for allowing one of the conduits 14,18 to snap into each of the openings and for retaining the conduit within the opening 32. In other words, the wall of each of the openings 32 defines a throat 34 in the opening 32. The throat or constriction 34 can widen or deform under a predetermined force to receive the conduit 14,18 and then snap back into place. In this way, the conduit 14,18 will be retained within the opening 32 by the constriction 34 or throat. The constriction 34 serves mainly to retain the conduit during shipping and preassembly. Of course, once the support fitting 20 is slid into place in the support structure 24 the conduit will be retained in the opening 34 by the wall of the support structure 24, and the constrictions 34 become superfluous.

The hinged embodiment of the support fitting 20 (shown in FIG. 4) includes closing means generally indicated at 36 for closing the "U" shaped openings 32 and retaining the conduits 14,18 within the support fitting. The closing means 36 includes a closing member 38 contacting the first side 26 of the support fitting 20 and closing the "U" shaped openings 32. The closing member 38 includes first and second semicircular pockets 40 corresponding with the first and second "U" shaped openings 32 on the support fitting 20 for retaining the conduits 14,18 between the support fitting and the closing member 38 when the pockets 40 on the closing member are aligned with the "U" shaped openings 32 on the support fitting.

The closing means 36 includes a hinge 42 interconnecting the support fitting 20 and the closing member 38. The closing means 36 also includes retaining means 44 for retaining the support fitting 20 and the closing member 38 together and preventing the movement of same about the hinge 42. The retaining means 44 includes a clip 44 disposed on an end of the support fitting 20 opposite the hinge 42 for clipping the support fitting and the closing member 38 together. The hinge 42 is disposed so that the closing member 38 and the support fitting 20 can rotate about an axis which is parallel to the axes through the openings 32.

Each conduit 14,16 includes a flange 46 disposed therearound at a predetermined point along the length of the conduit. The support fitting 20 includes a groove 48 following the contour of each of the "U" shaped openings 32 for guiding and retaining the flange 46 on the conduit 14,18. In the preferred embodiment, the conduit 14,18 will include a ferrule end fitting 15 for sliding into engagement with the openings 32. This type of end fitting includes the flange 46 and a parallel flange 47 parallel to the flange 46. When the conduit slides into the opening 32, the flange 46 will fit in the groove 48, and the parallel flange 47 will engage the front or back of the support fitting. This two flange design provides a firm connection between the conduit 14,16 and the support fitting 20.

All embodiments and versions of the support fitting 20 include a body 50 having a first side, a second side, a top, a bottom, a front and a back. The guides 30 include spaced apart front and back flanges 52,54 disposed adjacent the front and back, respectively, and extending away from the body 50 and down the first side, around the bottom side and up the second side. The spaced apart flanges 52,54 define a guide track 56 for receiving the support structure 24, guiding the support fitting 20 as same slides in bottom-first fashion into the slot 22 (as shown in FIG. 1) and for bracing the support fitting against back and forth movement within the slot by retaining the support structure 24 between the flanges.

On the "sides like yoke" embodiment and its various versions, the body 50 is the support fitting 20 itself. But in the "hinged" embodiment, the body 50 is actually the support fitting 20 and the closing member 38 together. Thus, the guide track 56 extends down the side of the closing member 38 opposite the side engaging the support fitting 20: the guide track 56 then extends along the bottom of the closing member 38, along the bottom of the support fitting 20, and up the side of the support fitting opposite the side engaging the closing member 38.

In most cases the end fitting 15 on the conduits 14,18 has a "D" shape adapted to fill the "U" shaped opening 32 in the support fitting 20. The upright portion of the "D" shaped fitting 15 includes spaced apart flanges defining a track 57. When the end fitting 15 is fully inserted into the opening 32, the track 57 is flush with the portion of the guide track 56 which runs down the first side 26 of the end fitting 20. In this way a track 56,57 will extend in unbroken fashion down the first side 26 of the support fitting 20.

All embodiments of the assembly 10 further include locking means generally indicated at 58 for locking the support fitting 20 to the support structure 24. The locking means 58 includes a locking arm 60 extending away from the second side of the support fitting 20, the locking arm being flexible to allow the arm to deflect with respect to the support fitting. The locking arm 60 usually extends from the rear flange 54 on the second side 28 of the support fitting 20, though it can also be adapted to extend from the front flange 52 as well.

The locking means 58 also includes a locking finger 62 extending generally perpendicularly away from the locking arm 60 for positioning in a hole 64 in the support structure 24. The locking finger 62 is generally cylindrical in shape, but it includes a tapered lower surface 66 to prevent the finger from catching on the wall of the support structure 24 when the support fitting 20 is slid into the slot 22 through the support structure.

The assembly 10 finally includes a back stop 68 extending from the second side of the support fitting 20 behind the locking arm 60. The back stop 68 is spaced apart from the back side of the locking arm 60 behind the locking finger 62 to prevent damage to the locking arm in two ways: the back stop prevents the locking arm from deflecting more than a predetermined distance when a force is applied to the locking arm at the front side; and the back stop 68 prevents objects from even touching the locking arm from the back side. Thus, the deflection of the locking arm 68 is controlled when the support fitting 20 is inserted in the support structure 24. The back stop 68 also protects the locking arm 60 during shipping by preventing excess bending of the locking arm while the support fitting 20 is in a box with many other support fittings.

It should also be mentioned that in some embodiments, particularly the "side slide yoke" embodiment, the support fitting 20 will be molded to include a molding hole 70 between the places where the two conduits 14,18, pass through. The support fitting 20 is molded with the molding hole 70 to facilitate the molding of the part by ensuring uniformity of wall thickness and strength. The existence of the molding hole 70 also saves on material. This molding practice is well known in the plastic molding art.

To assemble the subject invention, each conduit 14,16 is inserted in its respective opening 32 in the first side of the support fitting 20. If there is only one opening 32, then only one conduit is inserted. If there are two openings 32, then two conduits 14,18 are inserted, one in each opening. This of course varies with the embodiment or version of the assembly being used. If the hinged embodiment is used, the conduits 14,18 are inserted into their respective openings 32, and the closing member 38 rotates about the hinge 42 into engagement with the support fitting 20 and the clip 44 snaps the closing member and the support fitting together. Then, the assembly 10 (regardless of embodiment or version) is inserted into the slot 22 in the support structure 24 so that the wall of the support fitting 24 slides in the track 56. At a predetermined point, when the assembly 10 slides into the slot 22 to the point of the locking finger 62, the tapered surface 66 of the locking finger 62 hits the wall of the support structure 24. The downward movement of the assembly 10 into the slot 22 forces the finger, and thus the locking arm 60 to deflect back to prevent the finger 62 from catching on the wall. The elasticity or flexibility of the locking arm 60 biases the finger 62 against the wall as the assembly 10 slides further into place. At the point where the assembly 10 is fully inserted within the slot 22, the finger will find the hole 64 in the wall and the locking arm 60 will bias the finger 62 into the hole 64. Now, the assembly 10 is fully inserted in the slot 22 and the locking finger 62 retains the assembly in this position. The conduit or conduits 14,18 are fixed within the support fitting 20 in all versions and embodiments: in the case of the "side slide yoke," the wall of the support structure 24 closes each opening 32 in which a conduit 14,18 is inserted; in the case of the hinged version, the walls of the support structure 24 defining the slot 22 maintain the support fitting 20 and the closing member 38 together, and thus retain the conduit or conduits 14,18 within the support fitting.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A motion transmitting remote control assembly (10) for transmitting motion in a curved path by a motion transmitting core element, said assembly comprising:
    a first conduit (14);
    a first motion transmitting core element (12) slidably supported in said first conduit (14);
    a support fitting (20) for supporting said first conduit (14) in a slot (22) in a support structure (24); guides (30)
    said support fitting (20) including for sliding into engagement with the slot (22) in the support structure (24) and for retaining said support fitting in the other slot (22), said support fitting (20) including a body (50) having a first side (26), a second side (28), a top, a bottom, a front and a back, said guides (30) including spaced apart from and back flanges (52, 54) disposed adjacent said front and back, respectively, and extending away from said body (50) and down said first side, around said bottom side and up said second side, said spaced apart flanges defining a guide track (56) for receiving the support structure (24), for guiding said support fitting (20) as same slides in bottom-first fashion into the slot (22) and for bracing said support fitting against back and forth movement within the slot by retaining the support structure between said flanges (52, 54); said support fitting (20) including receiving means (32) extending transversely to said first side (26) for receiving a second conduit (18) transversely of said sides (26,28).

2. An assembly as set forth in claim 1 wherein said receiving means (32) includes at least one "U" shaped opening (32) in said first side of said support fitting (20) for slidably receiving the second conduit (18).

3. An assembly as set forth in claim 2 wherein said at least one "U" shaped opening (32) in said first side (26) of said support fitting (20) includes a constriction (34) constricting said "U" shaped opening (32) for allowing the second conduit (18) to snap into said opening and for retaining the second conduit in said second conduit within said opening.

4. An assembly as set forth in claim 3 including a second conduit (18) and a second motion transmitting core element (16) slidably supported in said second conduit (18), said support fitting (20) also supporting said second conduit.

5. An assembly (10) as set forth in claim 4 wherein said receiving means (32) includes two "U" shaped openings (32) in said first side (26) of said support fitting (20) each for slideably receiving a conduit (14,18).

6. An assembly (10) as set forth in claim 5 wherein each of said conduits (14,18) include a flange (46) disposed therearound at a predetermined point along the length of said conduit (14,18).

7. An assembly (10) as set forth in claim 6 wherein said support fitting (20) includes groove (48) following the contour of each of said "U" shaped openings (32) for guiding and retaining said flange (46) on said conduit (14,18).

8. An assembly (10) as set forth in claim 7 including closing means (36) for closing said "U" shaped opening (32) and retaining said conduits (14,18) within said support fitting (20).

9. An assembly (10) as set forth in claim 8 wherein by said closing means (36) includes first and second pockets (40) corresponding with said first and second "U" shaped openings (32) on said support fitting (20) for retaining said conduits (14,18) between said support fitting and said closing member (38) when said pockets (32) on said closing member are aligned with said "U" shaped openings on said support fitting.

10. An assembly (10) as set forth in claim 9 including a hinge (42) interconnecting said support fitting (20) and said closing member (38).

11. An assembly (10) as set forth in claim 10 including retaining means (44) for retaining said support fitting (20) and said closing means (36) together and preventing the movement of same about said hinge (42).

12. An assembly (10) as set forth in claim 11 wherein said retaining means (44) includes a clip (44) disposed on an end of said support fitting (20) opposite said hinge

(42) for clipping said support fitting and said closing member (38) together.

13. An assembly (10) as set forth in claim 1 including locking means (58) for locking said support fitting (20) to the support structure (24).

14. An assembly (10) as set forth in claim 13 wherein said locking means (58) includes a locking arm (60) extending away from said second side (28) of said support fitting (20), said locking arm (60) being flexible to allow said locking arm to deflect with respect to said support fitting.

15. An assembly (10) as set forth in claim 14 wherein said locking means (58) includes a locking finger (62) extending generally perpendicularly away from said locking arm (60) for positioning in a hole (64) in the support structure (24).

16. An assembly (10) as set forth in claim 15 wherein said locking arm (60) extends from said rear flange (54) on said second side (28) of said support fitting (20).

17. An assembly (10) as set forth in claim 16 said locking finger (62) has a cylindrical shape.

* * * * *